United States Patent [19]

Yokoyama et al.

[11] Patent Number: 5,571,545
[45] Date of Patent: Nov. 5, 1996

[54] HAMBURGER TYPE FOOD MATERIAL AND PROCESS OF MAKING IT

[75] Inventors: Hideaki Yokoyama, Takaishi; Hideo Sugano, Sennan-gun, both of Japan

[73] Assignee: Fuji Oil Company, Limited, Osaka-fu, Japan

[21] Appl. No.: 590,150

[22] Filed: Jan. 23, 1996

Related U.S. Application Data

[63] Continuation-in-part of Ser. No. 386,088, Feb. 9, 1995.

[30] Foreign Application Priority Data

Feb. 22, 1994 [JP] Japan ................... 6-024264

[51] Int. Cl.$^6$ .................... A23J 3/16
[52] U.S. Cl. ............... 426/93; 426/89; 426/102; 426/104; 426/574; 426/656; 426/802
[58] Field of Search .................. 426/656, 634, 426/574, 578, 575, 802, 104, 93, 89, 102

[56] References Cited

U.S. PATENT DOCUMENTS

| | | | |
|---|---|---|---|
| 4,361,588 | 11/1982 | Herz | 426/104 |
| 4,376,134 | 3/1983 | Kumar | 426/656 |
| 4,436,759 | 3/1984 | Trilling et al. | 426/574 |
| 4,495,205 | 1/1985 | Brander et al. | 426/104 |
| 4,536,406 | 8/1985 | Brander et al. | 426/104 |
| 4,784,870 | 11/1988 | Yokoyama et al. | 426/573 |
| 4,863,749 | 9/1989 | Yamada | 426/241 |
| 5,034,232 | 7/1991 | Sugitani et al. | 426/46 |
| 5,206,050 | 4/1993 | Jennings | 426/656 |
| 5,225,233 | 7/1993 | Komatsu et al. | 426/656 |

FOREIGN PATENT DOCUMENTS 0456461  11/1991  European Pat. Off. .

*Primary Examiner*—Esther Kepplinger
*Assistant Examiner*—Lien Tran
*Attorney, Agent, or Firm*—Wenderoth, Lind & Ponack

[57] ABSTRACT

A hamburger type food material to be stuffed with an edible stuffing which comprises as a main ingredient granular soybean proteins and 0.5 to 5% by weight of casein as dry weight, 0.5 to 6% by weight of egg white as dry weight, 0.2 to 9% by weight of m-starch as dry weight and 55 to 79% by weight of water based on the total weight of the raw material, and being substantially free from minced meat is disclosed. A hamburger type food containing an edible stuffing therein prepare by using this food material is also disclosed.

5 Claims, No Drawings

5,571,545

HAMBURGER TYPE FOOD MATERIAL AND PROCESS OF MAKING IT

This application is a continuation-in-part of now abandoned application, Ser. No. 08/386,088, filed Feb. 9, 1994.

FIELD OF THE INVENTION

The present invention relates to a hamburger type food material for the production of hamburger type food or an imitation hamburger which contains an edible stuffing therein. More specifically, the food material of the present invention is a hamburger-like material for stuffing an edible material thereinto or wrapping an edible stuffing therein and is mainly composed of granular soybean proteins and substantially free from minced meat. The food material of the present invention is suitable for the continuous production of hamburger type food or an imitation hamburger with an automatic device such as a device for wrapping an edible bean paste in a dough such as an encrusting machine, for example.

BACKGROUND OF THE INVENTION

Normally, hamburgers are prepared by using minced meat, onions, eggs and crumbs as raw materials and minced meat is an essential ingredient. In addition, a hamburger containing an edible stuffing such as a boiled egg therein has been known.

For example, JP-A49-71167 discloses a process for producing a hamburger stuffed with an edible material and, in this process, pork, beef, onions, crumbs, egg white, starch, flavors and seasonings are disclosed as raw materials for the hamburger. That is, the hamburger uses minced meat as an essential ingredient. Furthermore, no mechanical continuous shaping of the hamburger is used in this process.

JP-A 55-120773 discloses a process for producing a hamburger stuffed with cheese. This hamburger uses beast meats such as beef and pork and is a conventional one.

JP-A 55-120774 discloses a process for producing hamburgers. These hamburgers meet JAS standard and therefore use minced meat.

JP-A 56-8667 discloses a process for producing processed meat products including hamburgers. However, there is no disclosure of food containing any edible stuffing.

JP-A 60-227658 discloses a process for producing hamburgers containing edible stuffings. The hamburgers are produced by using conventional minced meat.

These known hamburgers and meat products can readily stuff edible materials thereinto or wrap edible stuffings therein because of adhesion and integrity of minced meat. However, if no minced meat is used in the production of such a product, it is very difficult to stuff an edible material into the product or to wrap an edible material in the product because of the absence of adhesion and integrity of minced meat. In addition, if such a product is produced continuously with a mechanical device, any edible material is hardly contained in a product without any meat, unless the product has adhesion, strength and a proper flexibility.

OBJECTS OF THE INVENTION

An object of the present invention is to provide a hamburger type food material to be contained an edible stuffing therein which is mainly composed of granular soybean proteins and substantially free from minced meat, and is suitable for the continuous production of hamburger type food or an imitation hamburger containing an edible stuffing therein with an automatic device such as a device for wrapping a bean paste in a dough.

This object as well as other objects and advantages of the present invention will become apparent from the following description.

SUMMARY OF THE INVENTION

The present inventors have found that a food material obtained by kneading a mixture of granular soybean proteins and certain amounts of certain materials can be continuously applied to an automatic device for stuffing or wrapping an edible material such as an encrusting machine, without breaking thereof and sticking to the device and that, even when no minced meat is used, hamburger type food or an imitation hamburger containing any selected edible stuffing therein, wherein the raw material is harmonized with the stuffing and the taste is palatable, can be obtained by roasting the food material containing the edible stuffing therein.

Thus, according to the present invention, there is provided a hamburger type food material to be stuffed with an edible stuffing which comprises as a main ingredient granular soybean proteins and 0.5 to 5% by weight of casein as dry weight, 0.5 to 6% by weight of egg white as dry weight, 0.2 to 9% by weight of α-starch as dry weight and 55 to 79% by weight of water based on the total weight of the food material, and being substantially free from minced meat.

Hamburger type food containing an edible stuffing therein produced by using the food material of the present invention is also provided.

DETAILED DISCLOSURE OF THE INVENTION

The granular soybean proteins used in the present invention have been known and marketed. Suitably, the granular soybean proteins to be used are a dry product obtained by pressurizing, heating and extruding a soy bean raw material together with water by an extruder to provide meat-like texture. Normally, the granular soybean proteins are reconstituted with water or hot water for using in the production of the hamburger type food material of the present invention. When the granular soybean proteins are reconstituted by addition of 3 times of water, about 25 to 60% by weight, preferably about 35 to 56% by weight of the reconstituted soybean proteins are used based on the total weight of the food material of the present invention. As dry weight, the granular soybean proteins are used in an amount of 6 to 15% by weight, preferably 9 to 14% by weight based on the total weight of the food material of the present invention. When the amount of the granular soybean proteins are too small, neither granular mouth feel of a hamburger nor palatable taste is obtained. On the other hand, when the amount is too large, continuous application of the food material to a device for wrapping an edible stuffing becomes difficult due to breaking thereof.

Casein to be used is not limited to a specific one and sodium caseinate, calcium caseinate, acid casein and the like can be used. In particular, sodium caseinate is suitable for providing the desired adhesiveness to the food material of the present invention. Casein is used in an amount of 0.5 to 5% by weight, preferably 1 to 3% by weight as dry weight based on the total weight of the food material of the present invention. When the amount of casein is too small, sufficient adhesion cannot be provided to the food material and breaking is caused upon application to a device. On the other hand, when the amount is too large, upon roasting and eating the hamburger type food produced by using the food material, it becomes too hard and the desired hamburger-like mouth feel is not obtained.

As egg white, fresh egg white, dried egg white and the like can be used. Egg white is used in an amount of 0.5 to 6% by weight, preferably 2 to 5% by weight as dry weight based on the total weight of the food material of the present invention. When the amount of egg white is too small, the desired adhesion and flexibility cannot be provided to the food material and breaking is caused upon application to a device. On the other hand, when the amount is too large, upon roasting and eating the hamburger type food produced by using the food material, elastic hardness is caused and the desired hamburger-like mouth feel is not obtained.

α-Starch is obtained by gelatinizing starch obtained from starch containing raw materials such as cereals, rootcrops and the like and is used in an amount of 0.2 to 9% by weight, preferably 0.5 to 7.5% by weight as dry weight based on the total weight of the food material of the present invention. When the amount of α-starch is too small, sufficient adhesion cannot be provided and, on the other hand, when the amount is too large, mouth feel of the hamburger type food obtained is too soft and the desired hamburger-like mouth feel is not obtained.

Water is contained in the raw materials used such as the granular soybean proteins, egg white and the like and is necessary for controlling hardness and flexibility so that the resulting hamburger type food material of the present invention is suitable for containing an edible stuffing therein. Although the amount of water is varied according to a particular composition of the raw materials used, suitably, water content is 55 to 79% by weight, preferably 56 to 78% by weight based on the total weight of the hamburger type food material of the present invention. When the amount of water is too small, the food material is broken upon applying to a device and, on the other hand, when the amount is too large, the resulting food material becomes too soft, causing sticking to a device and breaking of the food material.

In addition, the hamburger type food material of the present invention can contain a grated yam (*Dioscorea japonica*, etc.) and/or Gellan gum. Normally, the amount of the grated yam can be 0.3 to 1.5% by weight based on the total weight of the food material and the amount of Gellan gum can be 0.001 to 0.1% by weight based on the total weight of the food material. In general, upon using Gellan gum, it is dispersed in about 100 to 1,000 times of water.

Furthermore, the hamburger type food material of the present invention can contain one or more other gums such as carrageenan, xanthan gum and tamarind seed polysaccharides, hemicellulose and the like.

The hamburger type food material of the present invention can also contain fats and oils. Fats and oils provide flexibility and prevent the food material from sticking to a device. Furthermore, fats and oils improve mild and palatable taste of the resulting hamburger type food.

In the present invention, other ingredients such as vegetables (e.g., onions, etc.), flavors, seasonings, coloring agents and other food additives can be added.

The edible stuffing is not specifically limited and any edible stuffing which is applicable to a device such as that for wrapping a paste in a dough such as an encrusting machine, can be used. However, the present invention is characterized in that the food material contains an edible stuffing therein and, thereby, the desired palatable taste is obtained upon roasting the resulting hamburger type food.

Example of the edible stuffing include solid edible stuffings such as boiled eggs, chestnuts, ginkgo nuts, potatoes, corns sweet potatoes, carrots, pumpkins, squash, oranges, pineapples and the like. They can be stuffed or wrapped as they are or by cutting into suitable size. In addition, the solid edible stuffings can be used together with pastes or fluid materials such as soybean protein emulsion, cream, cream cheese, margarine, sauce or the like.

The hamburger type food material of the present invention with or without the edible stuffing can be transported and stored as it is with chilling, or can be transported and stored in a frozen state. Upon eating, the hamburger type food containing the edible stuffing can be roasted and flavored with a sauce or the like. Alternatively, the hamburger type food containing the edible stuffing can be semi-finished or completely roasted and then transported and stored in a chilled or frozen state. Upon eating, they can be thawed, warmed and cooked.

The hamburger type food of the present invention can be produced by mixing and kneading a mixture of granular soybean proteins reconstituted with water, 0.5 to 5% by weight of casein, 0.5 to 6% by weight of egg white as dry weight, 0.2 to 9% by weight of α-starch and 55 to 79% by weight of water based on the total weight of the mixture which is substantially free from minced meat to obtain the food material of the present invention and continuously and mechanically stuffing the solid edible stuffing thereinto. Normally, the weight ratio of the food material of the present invention to the edible stuffing is 9:1 to 4:6, preferably, 4:6.

The mixing and kneading can be carried out by using a conventional device such as a mortar, a silent cutter, a food cutter or the like.

The devise for continuous stuffing or wrapping the edible stuffing has been known.

The following Examples and Comparative Examples further illustrate the present invention in detail. However, they are not to be construed to limit the scope of the present invention. In the Examples and Comparative Examples, all the "parts" and "percents" are by weight, unless otherwise stated.

EXAMPLE 1

According to the formulation as shown in Table 1, a hamburger type food material was prepared by mixing and kneading the ingredients with a silent cutter.

Granular soybean proteins (manufactured and sold by Fuji Oil Co., Ltd. under the trade name of "Apex 430") (1 part) were reconstituted with water (3 parts) and slightly dehydrated granules (hereinafter referred to as hydrated granular soybean proteins) (solids content: 29.6%) were used.

Hydrated Gellan gum was prepared by dispersing Gellan gum (1 part) in water (500 parts).

TABLE 1

| Ingredients | A (parts) | B (parts) |
| --- | --- | --- |
| Hydrated granular soybean proteins | 37.1 | 37.1 |
| Palm oil (manufactured by Fuji Oil Co., Ltd.) | 8.7 | 8.7 |
| Grated yam powder (commercially available product) | 0.6 | 0.6 |
| α-Starch | 0.9 | 0.9 |
| Sodium caseinate | 2.0 | 2.0 |
| Dried egg white | 3.5 | 3.5 |
| Hydrated Gellan gam | 10.0 | 10.0 |
| Onion | 17.4 | 17.4 |
| Crumbs | 10.0 | 10.0 |

TABLE 1-continued

| Ingredients | A (parts) | B (parts) |
| --- | --- | --- |
| Flavor | 2.1 | 2.1 |
| Water | 0 | 5.8 |
| Total | 92.3 | 97.9 |
| Water content (%) | 57.8 | 60.4 |

The dry weight (%) of the main ingredients are shown in Table 2.

TABLE 2

| Main ingredients | A | B |
| --- | --- | --- |
| Granular soybean proteins | 11.9 | 11.2 |
| Palm oil | 9.4 | 8.9 |
| Grated yam powder | 0.6 | 0.6 |
| α-Starch | 1.0 | 0.9 |
| Sodium caseinate | 2.2 | 2.0 |
| Dried egg white | 3.8 | 3.6 |
| Gellan gum | 0.022 | 0.020 |

As an edible stuffing, a soybean protein emulsion (weight ratio of soybean proteins:oil:water=1:1:4) (15 parts) were mixed with commercially available steamed potatoes (1 cm dices) (70 parts), margarine (2 parts), starch (3 parts) and a flavor (10 parts) by using a kneader.

Then, the mixture was wrapped in the above-prepared hamburger type food material by using a device for wrapping a bean paste (Encrusting Machine "N 208" manufactured by Leon Automatic Machine) to shape into a hamburger type food containing the edible stuffing therein, continuously. The weight ratio of the hamburger type food material to the edible stuffing was 6:4.

The hamburger type food material was shaped into a ball of 10 cm diameter and was readily pressed with both hands to 1.5 cm in thickness without formation of cracking on the surface.

The hamburger type food thus produced was roasted by a direct heat roaster at 200° C. The roasted hamburger contained the potato stuffing and had a palatable taste with sufficient meat particle mouth feel.

COMPARATIVE EXAMPLE 1

According to the same manner as described in Example 1 A, a hamburger type food material was prepared except that the hydrated granular soybean proteins were reconstituted with hot water and dehydrated so that the water content of the resulting hamburger type food material became 50%.

According to the same manner as described in Example 1, the food material obtained was applied to the device. However, the food material was cracked or broken and the continuous wrapping operation was not carried out. Although the hamburger type food material was able to be shaped into a ball of 10 cm diameter, when it was pressed to 1.5 cm in thickness with both hands, cracking was formed at the peripheral surface.

COMPARATIVE EXAMPLE 2

According to the same manner as described in Example 1 A, a hamburger type food material was prepared except that sodium caseinate was not used or the amount of sodium caseinate was increased to 8%. According to the same manner, a hamburger type food was produced by using the food material thus obtained, roasted and tasted.

The hamburger type food material prepared without sodium caseinate had insufficient adhesiveness and, when it was applied to a device, it was broken. The hamburger type food material prepared with 8% of sodium caseinate had excellent shaping property upon applying the devise. However, when the resulting shaped hamburger type food was roasted and tasted, texture and mouth feel were too hard.

COMPARATIVE EXAMPLE 3

According to the same manner as described in Example 1 A, a hamburger type food material was prepared except that egg white was not used or the amount of egg white was increased to 8%. According to the same manner, a hamburger type food was produced by using the food material thus obtained, roasted and tasted.

The hamburger type food material prepared without egg white had insufficient adhesiveness and flexibility and, when it was applied to a device, it was cracked or broken. The hamburger type food material prepared with 8% of egg white had good shaping property upon applying the devise. However, when the resulting shaped hamburger type food was roasted and tasted, texture and mouth feel were elastic and hard as a boiled fish paste and were different from those of hamburgers.

EXAMPLE 2 AND COMPARATIVE EXAMPLES 4 AND 5

According to the same manner as described in Example 1 and according to the formulation as shown in Table 3, a hamburger type food material was prepared.

TABLE 3

| | (parts) | | | |
| --- | --- | --- | --- | --- |
| | Comp. | Ex. 2 | | Comp. |
| Ingredients | Ex. 4 | No. 1 | No. 2 | Ex. 5 |
| Hydrated granular soybean proteins | 40 | 40 | 40 | 40 |
| Sodium caseinate | 2 | 2 | 2 | 2 |
| Dried egg white | 3 | 3 | 3 | 3 |
| Onion | 20 | 20 | 20 | 20 |
| Crumbs | 5 | 5 | 5 | 5 |
| Flavor | 2 | 2 | 2 | 2 |
| α-Starch | 0 | 0.4 | 5 | 8 |
| Total | 72 | 72.4 | 77 | 80 |
| Water content (%) | 66.7 | 66.2 | 62.3 | 60 |

The dry weight (%) of the main ingredients are shown in Table 4.

TABLE 4

| | Comp. | Ex. 2 | | Comp. |
| --- | --- | --- | --- | --- |
| Main Ingredients | Ex. 4 | No. 1 | No. 2 | Ex. 5 |
| Granular soybean proteins | 13.9 | 13.8 | 13.0 | 12.5 |
| Sodium caseinate | 2.8 | 2.8 | 2.6 | 2.5 |
| Dried egg white | 4.2 | 4.2 | 3.9 | 3.8 |
| α-Starch | 0 | 0.55 | 6.49 | 11.0 |

According to the same manner as described in Example 1, a hamburger type food was produced by using the above-prepared food material and the edible stuffing of Example 1 and the shaping property and quality of the roasted hamburger type food were evaluated.

As a result, the hamburger type food materials of Example 2 were readily shaped by the device for wrapping bean pastes and the hamburger type food obtained by using the food materials had palatable tastes.

On the other hand, the food material of Comparative Example 4 which did not contain α-starch had insufficient adhesiveness and was cracked or broken upon applying to the device. The food material of Comparative Example 5 had good shaping property upon applying to the device. However, the roasted hamburger type food obtained by using the food material was too soft texture with poor hamburger-like mouth feel.

EXAMPLE 3

According to the same manner as described in Example 1 and according to the formulation as shown in Table 5, a hamburger type food material was prepared.

TABLE 4

| | (parts) | | | |
|---|---|---|---|---|
| Ingredients | No. 3 | No. 4 | No. 5 | No. 6 |
| Hydrated granular soybean proteins | 40 | 40 | 40 | 40 |
| Sodium caseinate | 2 | 2 | 2 | 2 |
| Dried egg white | 3 | 3 | 3 | 3 |
| α-Starch | 0.9 | 0.9 | 0.9 | 0.9 |
| Onion | 20 | 20 | 20 | 20 |
| Crumbs | 5 | 5 | 5 | 5 |
| Flavor | 2 | 2 | 2 | 2 |
| Hydrated Gellan gam | 0.5 | 8 | 12 | 25 |
| Total | 73.4 | 80.9 | 84.9 | 97.9 |
| Water content (%) | 66.1 | 69.2 | 70.7 | 74.6 |

The dry weight (%) of the main ingredients are shown in Table 6.

TABLE 6

| Main Ingredients | No. 3 | No. 4 | No. 5 | No. 6 |
|---|---|---|---|---|
| Granular soybean proteins | 12.6 | 12.4 | 11.8 | 10.2 |
| Sodium caseinate | 2.7 | 2.5 | 2.4 | 2.0 |
| Dried egg white | 4.1 | 3.7 | 3.5 | 3.1 |
| α-Starch | 1.3 | 1.1 | 1.1 | 0.9 |
| Gellan gam | 0.0014 | 0.0198 | 0.028 | 0.051 |

According to the same manner as described in Example 1, a hamburger type food was produced by using the above-prepared food material and the edible stuffing of Example 1 and the shaping property and quality of the roasted hamburger type food were evaluated.

As a result, the hamburger type food materials were readily shaped by the devise for wrapping bean pastes and the hamburger type food obtained by using the food materials had palatable tastes.

COMPARATIVE EXAMPLE 6

According to the same manner as described in Example 3, a hamburger type food material was prepared with increasing the amount of water to the water content of 79.7% by using 50 parts of hydrated Gellan gam obtained by addition of 500 times water (the total amount of the food material was 122.9 parts).

The hamburger type food material thus prepared was too soft, even though it contained an increased amount of Gellan gam and hardly wrapped the edible stuffing therein.

EXAMPLE 4

According to the same manner as described in Example 1 and according to the formulation as shown in Table 7, a hamburger type food material was prepared.

TABLE 7

| Ingredients | Parts | Dry weight % |
|---|---|---|
| Hydrated granular soybean proteins | 40 | 10.9 |
| Sodium caseinate | 2 | 2.17 |
| Dried egg white | 2 | 2.1 |
| α-Starch | 5 | 5.4 |
| Hydrated Gellan gam | 8 | 10.9 |
| Refined palm oil | 8 | 10.9 |
| Onion | 20 | — |
| Crumbs | 5 | — |
| Flavor | 2 | — |
| Total | 92 | |
| Water content (%) | 63 | |

According to the same manner as described in Example 1, a hamburger type food was produced by using the above-prepared food material (7 parts) and an edible stuffing prepared as shown in Table 8.

TABLE 8

| | (parts) | |
|---|---|---|
| Ingredients | a | b |
| Isolated soybean proteins | 8 | 3 |
| Water | 29 | 12 |
| Vegetable oil | 8 | 2 |
| Quvarl D20 | 20 | — |
| Convol 800 | — | 5 |
| Starch | 5 | 1 |
| Sodium caseinate | 2 | — |
| Cheese | 8 | — |
| Canned corn | — | 25 |
| Potato | — | 72 |
| Flavor | — | 5 |

A soybean emulsion was prepared by using the isolated soybean proteins which were same as the granular soybean proteins used in Example 1 and the vegetable oil which was soybean refined oil. The cheese was a commercially available processed cheese.

"Quvarl D20" is the trade name of filled cheese manufactured and sold by Fuji Oil Co., Ltd. and "Convol 800" is the trade name of margarine manufactured and sold by Fuji Oil Co., Ltd.

Potato used was cut into dices and cooked. The shaping property and quality of the roasted hamburger type food were evaluated.

The resulting hamburger type food material had good shaping property and the roasted hamburger type food obtained by using the food materials had palatable tastes similar to a hamburger using minced meat.

As described hereinabove, according to the present invention, it is possible to produce a hamburger type food containing an edible stuffing therein by wrapping the edible stuffing in a hamburger type food material which is substantially free from minced meat, continuously. Then, the hamburger type food having a palatable taste can be served upon roasting, even if any minced meat is used.

What is claimed is:

1. An imitation hamburger which comprises an edible stuffing wrapped with a food composition, said food composition comprising, as a main ingredient, granular soybean proteins and 0.5 to 5% by weight of casein as dry weight, 0.5 to 6% by weight of egg white as dry weight, 0.2 to 9% by weight of a-starch as dry weight, 0.001 to 0.1% by weight of Gellan gum and 55 to 79% by weight of water, based on the total weight of the composition, and said composition being free from minced meat.

2. The imitation hamburger according to claim 1, wherein the food composition contains 6 to 15% by weight as dry weight of granular soybean proteins.

3. The imitation hamburger according to claim 1, wherein the casein is sodium caseinate.

4. The imitation hamburger according to claim 1, wherein the food composition further comprises 0.3 to 1.5% by weight of dried grated yam.

5. A process for producing an imitation hamburger which comprises the steps of:

mixing and kneading a mixture of granular soybean proteins reconstituted with water, 0.5 to 5% by weight of casein, 0.5 to 6% by weight of egg white as dry weight, 0.2 to 9% by weight of α-starch, 0.001 to 0.1% by weight of Gellan gum and 55 to 79% by weight of water based on the total weight of the mixture, which is free from minced meat, to obtain a composition for an imitation hamburger, and continuously and mechanically wrapping said composition around a solid edible stuffing to form an imitation hamburger having the edible stuffing wrapped therein.

* * * * *